(12) United States Patent  (10) Patent No.: US 7,204,684 B2
Ederer et al.  (45) Date of Patent: Apr. 17, 2007

(54) INTERCHANGEABLE CONTAINER

(76) Inventors: Ingo Ederer, Greifenberger Str. 6, D-86911 Pflaumdorf (DE); Rainer Höchsmann, Schloss Str. 16, D-86682 Genderkingen (DE); Bernhard Graf, Valentin-Kindling Str. 1, D-86899 Landsberg (DE); Alexander Kudernatsch, Sauling Str. 39, D-86163 Augsburg (DE)

( * ) Notice: Subject to any disclaimer, the term of this patent is extended or adjusted under 35 U.S.C. 154(b) by 285 days.

(21) Appl. No.: 10/381,548

(22) PCT Filed: Sep. 23, 2001

(86) PCT No.: PCT/DE01/03662

§ 371 (c)(1), (2), (4) Date: Aug. 7, 2003

(87) PCT Pub. No.: WO02/26478

PCT Pub. Date: Apr. 4, 2002

(65) Prior Publication Data

US 2004/0026418 A1  Feb. 12, 2004

(30) Foreign Application Priority Data

Sep. 26, 2000 (DE) ................................ 100 47 615

(51) Int. Cl.
*B29B 13/08* (2006.01)
(52) U.S. Cl. ..................... 425/174.4; 425/182; 425/375
(58) Field of Classification Search ............. 425/174.4, 425/182, 375
See application file for complete search history.

(56) References Cited

U.S. PATENT DOCUMENTS

| 4,247,508 | A | 1/1981 | Housholder |
| 4,279,949 | A | 7/1981 | Esser |
| 4,369,025 | A | 1/1983 | von der Weid |
| 4,575,330 | A | 3/1986 | Hull |
| 4,752,352 | A | 6/1988 | Feygin |
| 4,863,538 | A | 9/1989 | Deckard |
| 4,938,816 | A | 7/1990 | Beaman et al. |
| 4,944,817 | A | 7/1990 | Bourell et al. |
| 5,017,753 | A | 5/1991 | Deckard |
| 5,053,090 | A | 10/1991 | Beaman et al. |

(Continued)

FOREIGN PATENT DOCUMENTS

DE  4300478 C1  8/1994

(Continued)

OTHER PUBLICATIONS

Sachs et al., "Three-Dimensional Printing: Rapid Tooling and Prototypes Directly From a CAD Model", Massachusetts Institute of Technology, pp. 143-151.

(Continued)

*Primary Examiner*—Robert Davis
*Assistant Examiner*—Maria Veronica Ewald
(74) *Attorney, Agent, or Firm*—Dobrusin & Thennisch PC

(57) ABSTRACT

The invention relates to an interchangeable container (1) for a device used to construct models. Said container forms a substantially delimiting frame, into which a workpiece platform (2) that acts as a base can be inserted. The interchangeable container (1) contains a support (3) onto which the workpiece platform (2) is introduced.

5 Claims, 3 Drawing Sheets

U.S. PATENT DOCUMENTS

| | | | |
|---|---|---|---|
| 5,076,869 A | 12/1991 | Bourell et al. | |
| 5,127,037 A | 6/1992 | Bynum | |
| 5,132,143 A | 7/1992 | Deckard | |
| 5,147,587 A | 9/1992 | Marcus et al. | |
| 5,155,324 A | 10/1992 | Deckard et al. | |
| 5,156,697 A | 10/1992 | Bourell et al. | |
| 5,182,170 A | 1/1993 | Marcus et al. | |
| 5,204,055 A | 4/1993 | Sachs et al. | |
| 5,221,539 A * | 6/1993 | Pallerberg et al. | 425/144 |
| 5,252,264 A | 10/1993 | Forderhase et al. | |
| 5,284,695 A | 2/1994 | Barlow et al. | |
| 5,296,062 A | 3/1994 | Bourell et al. | |
| 5,316,580 A | 5/1994 | Deckard | |
| 5,340,656 A | 8/1994 | Sachs et al. | |
| 5,342,919 A | 8/1994 | Dickens, Jr. et al. | |
| 5,352,405 A | 10/1994 | Beaman et al. | |
| 5,382,308 A | 1/1995 | Bourell et al. | |
| 5,387,380 A | 2/1995 | Cima et al. | |
| 5,431,967 A | 7/1995 | Manthiram et al. | |
| 5,490,962 A | 2/1996 | Cima et al. | |
| 5,518,680 A | 5/1996 | Cima et al. | |
| 5,597,589 A | 1/1997 | Deckard | |
| 5,616,294 A | 4/1997 | Deckard | |
| 5,639,070 A | 6/1997 | Deckard | |
| 5,639,402 A | 6/1997 | Barlow et al. | |
| 5,647,931 A | 7/1997 | Retallick et al. | |
| 5,658,412 A | 8/1997 | Retallick et al. | |
| 5,753,274 A * | 5/1998 | Wilkening et al. | 425/174.4 |
| 5,807,437 A | 9/1998 | Sachs | |
| 5,902,441 A | 5/1999 | Bredt et al. | |
| 5,943,235 A | 8/1999 | Earl et al. | |
| 5,965,170 A | 10/1999 | Matsuoka et al. | |
| 6,007,318 A | 12/1999 | Russell et al. | |
| 6,036,777 A | 3/2000 | Sachs | |
| 6,042,774 A | 3/2000 | Wilkening et al. | |
| 6,116,517 A | 9/2000 | Heinzl et al. | |
| 6,146,567 A | 11/2000 | Sachs et al. | |
| 6,147,138 A | 11/2000 | Hochsmann et al. | |
| 6,155,331 A | 12/2000 | Langer et al. | |
| 6,193,922 B1 | 2/2001 | Ederer | |
| 6,217,816 B1 | 4/2001 | Tang | |
| 6,258,170 B1 * | 7/2001 | Somekh et al. | 118/715 |
| 6,316,060 B1 | 11/2001 | Elvidge et al. | |
| 6,375,874 B1 | 4/2002 | Russell et al. | |
| 6,401,001 B1 | 6/2002 | Jang et al. | |
| 6,403,002 B1 | 6/2002 | Van der Geest | |
| 6,416,850 B1 | 7/2002 | Bredt et al. | |
| 6,423,255 B1 | 7/2002 | Hoechsmann et al. | |
| 6,460,979 B1 | 10/2002 | Heinzl et al. | |
| 6,554,600 B1 * | 4/2003 | Hofmann et al. | 425/174.4 |
| 6,610,429 B2 | 8/2003 | Bredt et al. | |
| 6,838,035 B1 | 1/2005 | Ederer et al. | |
| 7,004,222 B2 | 2/2006 | Ederer et al. | |
| 2002/0026982 A1 | 3/2002 | Bredt et al. | |
| 2004/0025905 A1 | 2/2004 | Ederer et al. | |
| 2004/0026418 A1 | 2/2004 | Ederer et al. | |
| 2004/0035542 A1 | 2/2004 | Ederer et al. | |
| 2004/0056378 A1 | 3/2004 | Bredt et al. | |

FOREIGN PATENT DOCUMENTS

| | | |
|---|---|---|
| DE | 4325573 | 2/1995 |
| DE | 29506204.5 | 4/1995 |
| DE | 4440397 | 9/1995 |
| DE | 29701279 | 1/1997 |
| DE | 19511772 C2 | 9/1997 |
| DE | 19846478 | 4/2000 |
| DE | 19853834 | 5/2000 |
| DE | 10047614 | 4/2002 |
| EP | 0711213 B1 | 5/1995 |
| EP | 0361847 | 11/1995 |
| EP | 0 431 924 | 1/1996 |
| EP | 0688262 | 6/1999 |
| EP | 0734842 | 8/1999 |
| EP | 1163999 A2 | 5/2001 |
| FR | 2790418 | 9/2000 |
| WO | WO 00/03324 | 1/2000 |
| WO | WO 00/21736 | 4/2000 |
| WO | WO 01/26885 | 4/2001 |
| WO | WO 01/72502 A1 | 4/2001 |
| WO | WO 02/064353 | 8/2002 |
| WO | WO 02/064354 | 8/2002 |
| WO | WO 03/016030 | 2/2003 |
| WO | WO 03/103932 A1 | 12/2003 |

OTHER PUBLICATIONS

Sachs et al., "Three-Dimensional Printing: Rapid Tooling and Prototypes Directly From a CAD Model", Massachusetts Institute of Technology, pp. 131-136.

Williams, "Feasibility Study of Investment Casting Pattern Design by Means of Three Dimensional Printing", Department of Mechanical Engineering, Jun. 5, 1989, pp. 2-15.

Cima et al., "Computer-derived Microstructures by 3D Printing: Bio- and Structural Materials," SFF Symposium, Austin, TX (1994).

International Search Report, PCT/DE00/03324, dated May 6, 2001.

International Search Report, PCT/DE01/03662, dated Jan. 3, 2002.

International Search Report, PCT/DE01/03661, dated Feb 28, 2002.

International Search Report, PCT/DE02/01103, dated Sep. 30, 2002.

Copending National Phase Application, WO 02/26419, dated Apr. 4, 2002 with English Translation.

Copending National Phase Application, WO 02/28568, dated Apr. 11, 2002 with English Translation.

Copending National Phase Application, WO 02/26420, dated Apr. 4, 2002 with English Translation.

Copending National Phase Application, WO 02/083323, dated Oct. 24, 2002 with English Translation.

Opposition of patent No. DE10047614 (summary attached) Jun. 25, 2003.

Gephart, Rapid Prototyping, pp. 118-119 (summary attached), 1996.

Marcus et al, Solid Freedom Fabrication Proceedings, Sep. 1993.

EOS Operating Manual for Laser Sintering Machine with brief summary.

Opposition to European Patent No. 1322458(B1), Jan. 19, 2005.

Translation to Opposition to EP1322458 (previously cited on Feb. 21, 2006).

US 4,937,420, 06/1990, Deckard (withdrawn)

\* cited by examiner

INTERCHANGEABLE CONTAINER

This invention relates to a job box for a pattern building device, which forms primarily a bounded frame and whose base can be a workpiece platform mounted within the job box.

Devices for building patterns have been known in the prior art for a long time, including laser sintering machines that have a housing arranged with a sintering or processing chamber therein. The upper workspace of this processing chamber includes the optics of a sintering laser in the form of a scanner. The scanner makes up the optical system for directing the laser beam, which delivers the energy required to sinter the sintering material. Below this optical system is a vertically movable workpiece platform with a material feeder and spreader situated above the platform, whereby the spreader serves to feed a powdered sintering material from a storage bin situated in the workspace above the workpiece platform.

Such a laser sintering machine is used to build the part in layers in the central area of the vertically movable workpiece platform. Up to now, to prevent the powdered sintering material that has not been exposed and thus not sintered from falling off of the workpiece platform, the outer zones of the platform have usually been sintered simultaneously with the actual building of the part, so as to form an edge serving as a boundary for the workpiece platform.

This type of approach had many disadvantages, among them the fact that the making of a boundary for the workpiece platform requires additional exposure and also extra thermoplastic powder that cannot be reused.

A particular disadvantage is that any error in making the boundary will lead to an inadequately stable box type bounding structure, which could result in deformation and consequent loss of the part either prior to or after its removal from the vertically movable workpiece platform.

Additionally, damage or breaks in the boundary during removal of the workpiece platform from the laser sintering machine result in powder filling the lower workspace of the sintering machine, soiling it and thereby causing extra breakdowns, delays, and servicing requirements for the laser sintering machine.

In order to overcome these known disadvantages for lasers of the state of the art, it known from the German patent DE 198 46 478 to mount a bounded frame job box in the sintering chamber, in which the workpiece platform is integrated as a base. Furthermore, the sintering chamber has a carrier arrangement on which the workpiece platform is supported during operation of the laser sintering machine. This type of job box has not only a shaft-like exterior that forms the bounding frame, but also a typical workpiece platform integrated into the shaft-like exterior such that it is vertically movable.

The building of a part in layers means that the box base is lowered successively, i.e. layer-by-layer, within the bounding frame, and the workspace above the workpiece platform is repeatedly covered with new powdered sintering material by a spreader in a conventional manner.

With such a job box, it is no longer necessary to form a boundary while building the part. It is fully adequate to sinter just the actual workpiece, which is protected against deformation by being held within the stable job box and its unsintered sintering material therein.

Besides, this job box can be removed in one piece and replaced by a new one, making it unnecessary to wait until the respective part is stable enough to be removed without problems.

However, this type of job box has been found to have the disadvantage that handling the workpiece platform for building parts still calls for a significant amount of effort. For instance, if on completion of a pattern the workpiece platform is to be removed from the job box and replaced by another empty platform, the task must be accomplished in a very precise manner to ensure that the platform is again placed and mounted precisely in the job box.

It has been found to be especially difficult when a sealing means is present between the workpiece platform and the job box. Seals are very important when using powdered materials for the building process, since they can affect the vertical positioning of the workpiece platform within the job box.

It is thus known that when the job box has engagement recesses for vertical positioning situated above the workpiece platform, they must covered so as to be impervious to powder. However, such types of seals must be taken out of the job box when dismounting the workpiece platform and replaced when mounting a new workpiece platform.

Hence, it is the object of this invention to develop a job box that can make it easier to mount and dismount workpiece platforms.

According to the invention, this requirement is fulfilled through a job box of the aforementioned type that includes a carrier on which the workpiece platform is mounted.

This means, for example, that according to the invention the workpiece platform that can be dismounted from the job box needs to be installed only on the carrier, which is appropriately attached to the job box and just carries the platform.

After each replacement, the workpiece platform thus does not need to be positioned precisely in the job box or to be mounted or attached.

It should be emphasized that the job box according to the invention can be mounted in all devices for pattern building known to persons skilled in the art. Hence, it is not restricted for mounting in any particular pattern building process. It can be utilized just as well for selective laser sintering as in a device for pattern building from moulding sand, casting resins, and curing agents.

The statement that the workpiece platform should be mounted as a base of the job box, is not to imply that the workpiece platform shall be arranged at the base of the job box or that it forms its lowest extremity. The term base is to be understood more as a shelf. This does not exclude the possibility that the job box has other bases or a specially designed base area.

However, for the greatest ease in building a job box, it has been shown to be advantageous to make the carrier as a frame. In such a case, the frame could encircle the inner wall of the job box, or just as well be a part thereof. Nevertheless, it should be built wide enough such that the workpiece platform can be mounted on it without possibly being twisted.

If the job box has braces in its lower section, they help achieve much greater stiffness of the job box's frame design, whereby cross-braces have been shown to be especially advantageous. All other types of braces are conceivable, including diagonal braces.

The terms "up" and "down" used in these embodiments always imply a proper operating position of the job box. Such a position is one in which the pattern building takes place in an appropriate device, whereby the side of the workpiece platform mounted in the job box on which the pattern is built, faces up.

It is preferred that the lower extremity of the job box according to the invention has appropriate cutouts for easy access with a forklift, for enabling transport in a simple manner.

If the job box sides additionally have transport eyelets, the job box could be transported easily with a crane as well.

In order to enhance the stiffness of the job box even further, it is preferred to use a double-wall construction for the job box.

Although the job box and the workpiece platform could fundamentally have any imaginable shape in a plan view, practical considerations and ease of manufacturing have nevertheless found a square or rectangular shape to be advantageous.

Basically it is feasible to have a vertical positioning arrangement that engages either under the job box or one that is integrated as a permanent component of the job box.

However, to achieve stable conditions by utilizing a vertical positioning means installed in an appropriate device, it is advantageous to have such means arranged mainly laterally on the sides of the job box, i.e. as recesses on two opposing sides running from the top down, for adjusting the vertical position.

Accordingly, the job box encompasses four sidewalls arranged essentially at right angles to each other. The workpiece platform can be displaced vertically within these sidewalls.

Herein it is preferred to have a means for making the recesses above the workpiece platform impervious to powder. This could be achieved, at least where the recesses are situated above the workpiece platform, with a sealing means between the inside wall of the job box and the carrier.

This occurs preferably with a type of blind, for example one made of sheet metal, fixed to the upper edge of the job box, which rests against the inner box wall as the workpiece platform sinks, thereby covering the recesses.

To avoid the sheet metal from possibly becoming entangled between engagement catches and the workpiece platform, it is preferred to have appropriate sliding bearings in the workpiece platform's carrier to channel the metal sheets along the insides of the job box.

Additionally, holding magnets that function with the blind could be arranged in the job box. Due to the holding magnets, the blind clings very closely to the inner side of the rear box wall, such that either none or very little powder can fall into the lower area of the machine.

A holding magnet arrangement limits the choice of materials that can be used for job box components. Instead of a seal utilizing a holding magnet, an alternative is a felt seal between the carrier and the inside wall of the job box, which can be loaded through springs to achieve the desired application force.

The job box according to the invention has demonstrated its advantage when applied in a device for pattern building from moulding sand, casting resins, and appropriate curing agents.

Similarly, an application is also conceivable in a selective laser sintering device.

The preferred embodiment of the invention will now be explained in more detail with reference to the accompanying drawings, in which.

Figure 1:
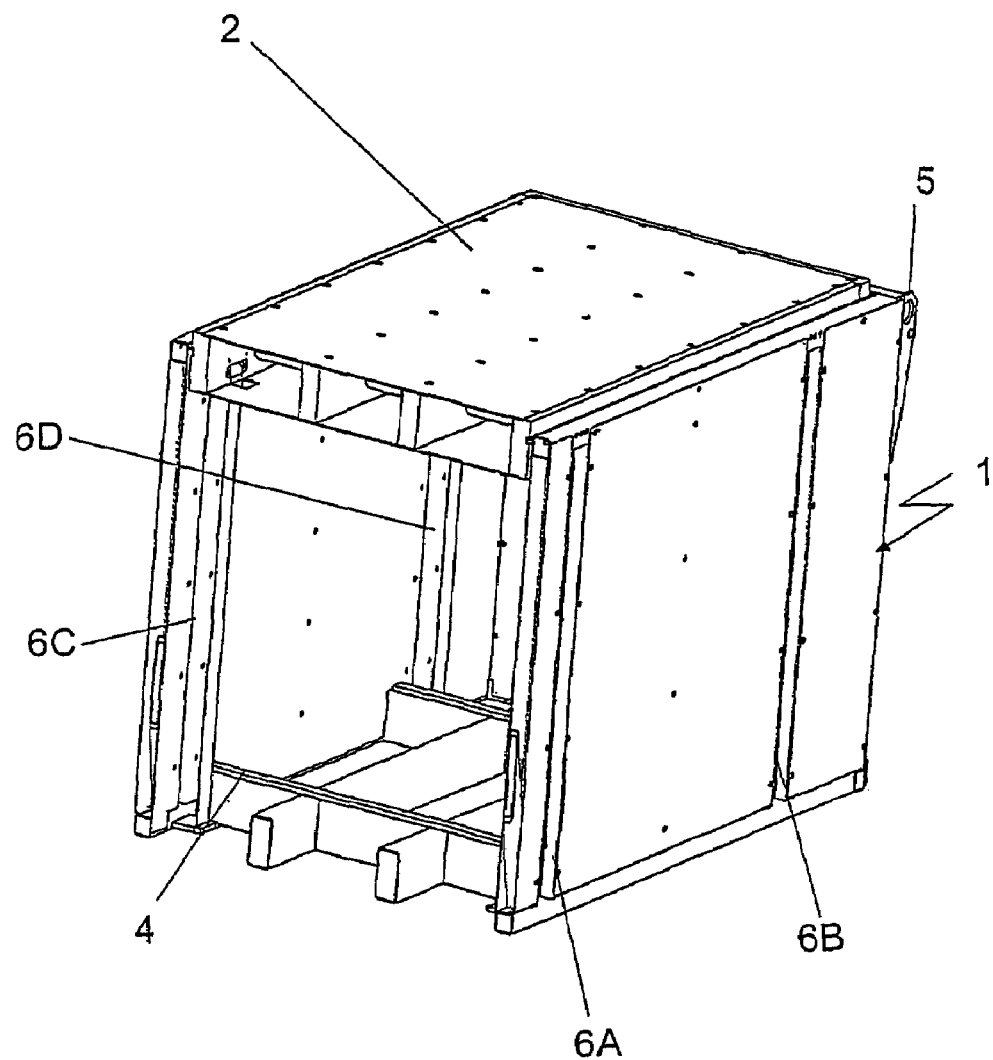
FIG. 1 is a three-dimensional view of a job box with a mounted workpiece platform in a cross-sectional representation of a preferred embodiment of the invention.

FIG. 1 depicts a three-dimensional cross-section of job box 1. This means that job box 1 is shown cut out in a three-dimensional view. Job box 1 has a total of four sidewalls arranged such as to form a rectangular cross-section in plan view.

The base of this job box 1 is formed with a workpiece platform 2, mounted like the base of a cupboard or a shelf. This workpiece platform 2 is in turn mounted on a carrier 3 not distinguishable in FIG. 1.

Figure 2:
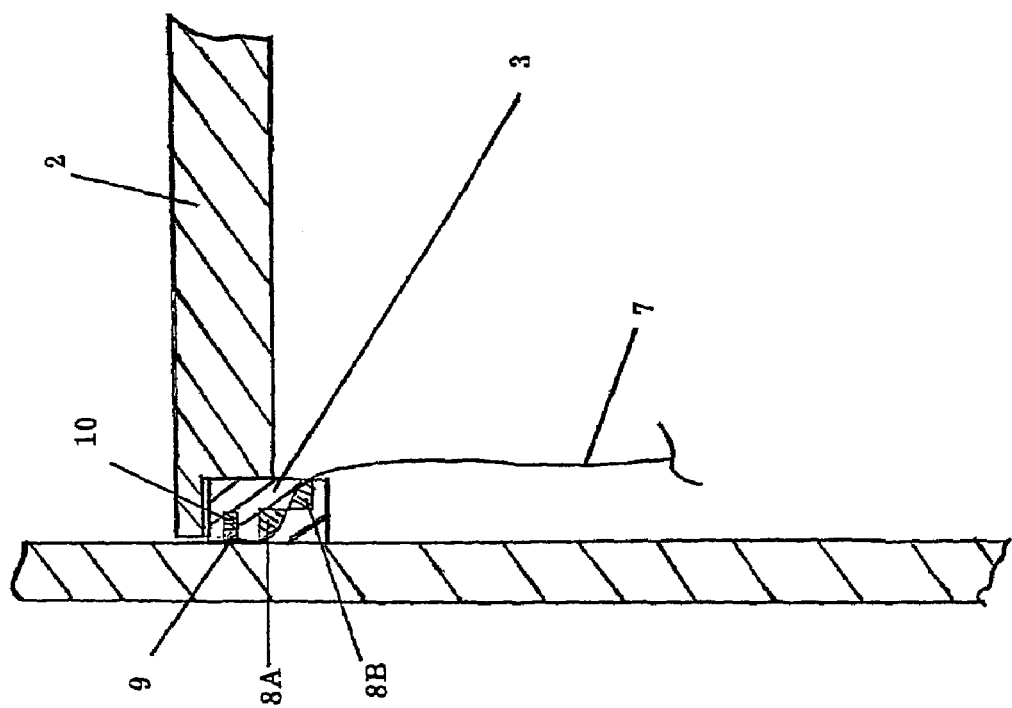
FIG. 2 is a front view of an enlarged section of the section shown in FIG. 1.
Figure 3:
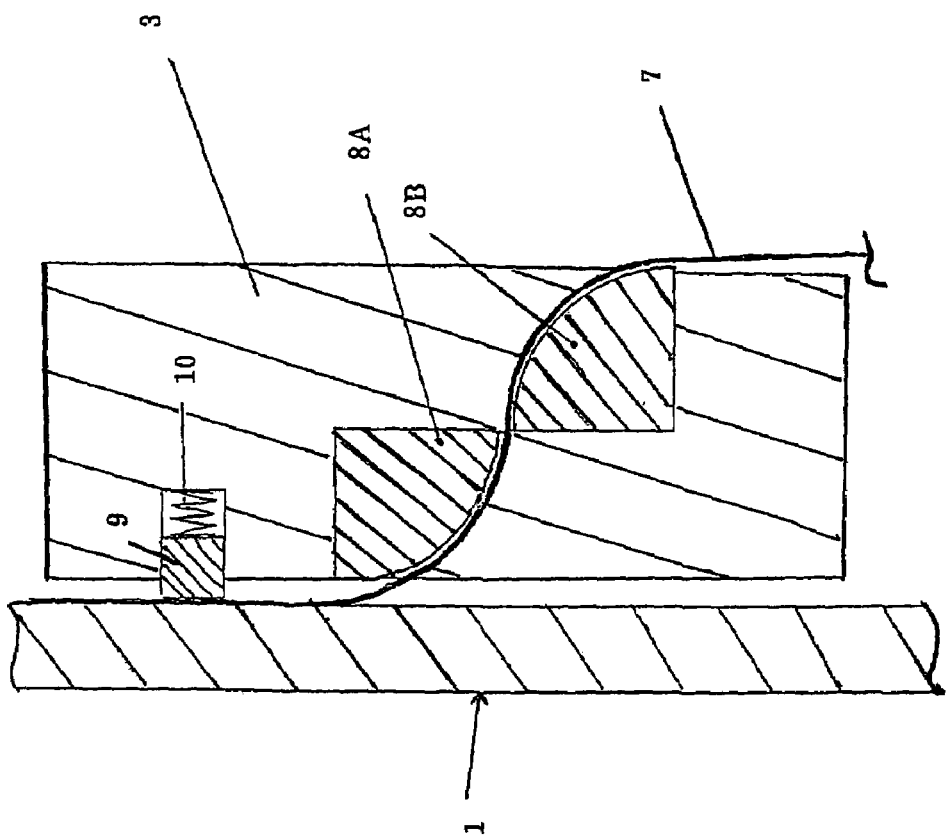
FIG. 3 is a further enlargement of the section illustrated in FIG. 2.

In FIGS. 2 and 3 that show front views of the schematic sections more precisely, it is clear that carrier 3 is a type of frame running mainly along the inside walls of job box 1.

Additionally, FIG. 1 shows cross-braces 4 at the base of job box 1, each of which connect the opposing sidewall of job box 1. It can also be seen in FIG. 1 that two cross-braces each run between the sidewalls. Additionally, these cross-braces have a relatively large cross-section, which increases the stiffness of job box 1 significantly.

In order to enhance the stiffness of job box 1 even further, job box 1 of the preferred second embodiment of the invention has a double-wall construction.

Additionally, at least one side of job box 1 is fitted with transport eyelets 5, which enable transport for example with a crane, such that job box 1 could be installed with a crane in a pattern building device or simply transported over long distances.

As shown particularly in FIG. 2, in contrast to the solutions known from the state of the art workpiece platform 2 mountable in job box 1 is constructed in such a way that it is arranged on carrier 3 shown as a frame here.

The vertical position of workpiece platform 2 is set by positioning frame 3 on which workpiece platform 2 is mounted, such that appropriate sealing between the inside wall of job box 1 and frame 3 must occur to prevent powdered material from entering the vertical positioning means during pattern building with such materials.

As shown especially in FIG. 1, job box 1 has recesses that run primarily from top down and serve to vertically position frame 3. The application of job box 1 for pattern building, in particular castings, enables the use of job box 1 in such a manner that catches run in the device's recesses 6A, 6B, 6C, and 6D and engage underneath workpiece platform 2. These catches in turn could be attached to a lifting plate, which could be fastened through linear guides and a feed rod on to the relevant frame or the housing of the device. At the start of the building process, workpiece platform 2 is raised to its highest position and thus readied for commencement.

Recesses 6A, 6B, 6C, and 6D provided for lateral engagement of the catches into job box 1, for example, preferably run across the box wall. However, as far as possible these recesses 6A, 6B, 6C, and 6D should not become soiled by sand or similar materials falling off of workpiece platform 2. Accordingly, a sealing means is preferably included such that thin metal sheets 7 attached to job box 1, particularly on its top edge, press against the inside of job box 1 during pattern building, for instance due to the force exerted by the moulding sand, and thereby cover up the slot. In order that these metal sheets 7, when applied in the above-described device, do not become entangled between a catch and the carrier or frame 3, it is preferred to have appropriate sliding bearings in carrier 3 to channel the metal sheets along the insides of job box 1.

These sliding bearings could, for example, be the deflection channels 8A and 8B shown in FIGS. 2 and 3.

The sheet metal 7 now functions like a blind, by resting against the inner wall of job box 1 as workpiece platform 2 or frame 3 sinks and thereby covering engagement recesses 6A, 6B, 6C, and 6D.

In order to improve the sealing between frame 3 and job box 1 even further, or especially against its inside wall, it is preferred to integrate a supplementary sealing means in the lateral channel of frame 3, depicted herein according to the preferred embodiment as felt seal 9. This felt seal 9 is loaded with springs 10 to achieve the necessary application force.

Due to the force applied by spring 10, such a sealing means 9 can essentially balance out any unevenness in job box 1. Such a spring loading means also allows avoidance of highly flexible and sensitive materials that tend to shrink.

The advantage of such a design for job box 1, is that it becomes possible to dismount workpiece platform 2 from job box 1, for instance by pulling it out and replacing it with another empty workpiece platform 2, without the need to dismantle any of the relevant sealing means present in job box 1.

The invention claimed is:

1. A job box for a pattern building device comprising:
    a workpiece platform;
    at least one pair of spaced apart but connected opposing sidewalls, each sidewall having at least one vertically oriented recess defined therein, adapted for vertical positioning of the workpiece platform in the job box; and
    a carrier that vertically moves within the plurality of sidewalls, the carrier being adapted for defining a seal, independent of any seal of the workpiece platform, for the at least one vertically oriented recess in each sidewall, wherein the carrier includes at least two separable pieces, each including at least one bearing surface and further wherein a sealing strip for the at least one vertically oriented recess in each sidewall is positioned at an interface region between the separable pieces, wherein a generally sinusoidal interface is defined in the interface region between the two separable pieces.

2. The job box according to claim 1, wherein the seal of the workpiece platform includes a spring loaded seal.

3. A job box for a pattern building device comprising:
    a workpiece platform including a peripheral edge region;
    at least one pair of spaced apart but connected opposing sidewalls, each sidewall having at least one vertically oriented recess defined therein, adapted for vertical positioning of the workpiece platform in the job box; and
    a carrier that substantially abuts the sidewalls and that vertically moves within the plurality of sidewalls, wherein the peripheral edge region of the platform engages an opposing surface of the carrier, wherein the carrier includes a spring loaded seal, and wherein the carrier includes at least two separable pieces, each including at least one bearing surface and a sealing strip is positioned at an interface region between the separable pieces.

4. A job box for a pattern building device comprising:
    a workpiece platform including a peripheral edge region;
    at least one pair of spaced apart but connected opposing sidewalls; and
    a carrier that substantially abuts the sidewalls and that vertically moves within the plurality of sidewalls, wherein the peripheral edge region of the platform engages an opposing surface of the carrier, wherein the carrier is mounted in sealing relation to the sidewalls by at least one seal that is defined by the carrier, wherein the carrier includes at least two separable pieces, each including at least one bearing surface and further wherein a sealing strip is positioned at an interface region between the separable pieces.

5. The job box according to claim 4, wherein the seal of the workpiece platform includes a spring loaded seal.

* * * * *

UNITED STATES PATENT AND TRADEMARK OFFICE
CERTIFICATE OF CORRECTION

PATENT NO. : 7,204,684 B2
APPLICATION NO. : 10/381548
DATED : April 17, 2007
INVENTOR(S) : Ingo Ederer et al.

It is certified that error appears in the above-identified patent and that said Letters Patent is hereby corrected as shown below:

On title page, item 56 References Cited U.S. Patent Documents
add --4,937,420 6/1990 Deckard--.

Signed and Sealed this

Twenty-fifth Day of March, 2008

JON W. DUDAS
*Director of the United States Patent and Trademark Office*